(12) United States Patent
Chang et al.

(10) Patent No.: US 9,873,463 B1
(45) Date of Patent: Jan. 23, 2018

(54) ASSEMBLY FOR VEHICLE

(71) Applicant: Hyundai Motor Company, Seoul (KR)

(72) Inventors: Hoon Chang, Seoul (KR); Jeong Min Cho, Suwon-Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/289,754

(22) Filed: Oct. 10, 2016

(30) Foreign Application Priority Data

Dec. 10, 2015 (KR) .......................... 10-2015-0176387

(51) Int. Cl.
*B60N 99/00* (2006.01)
*B62D 27/02* (2006.01)
*B62D 29/04* (2006.01)

(52) U.S. Cl.
CPC ........... *B62D 27/02* (2013.01); *B62D 29/048* (2013.01)

(58) Field of Classification Search
CPC .............................. B62D 27/02; B62D 29/048
See application file for complete search history.

(56) References Cited

FOREIGN PATENT DOCUMENTS

| JP | 2003-026052 A | 1/2003 |
|----|---------------|--------|
| JP | 2003-116653 A | 4/2003 |
| JP | 2005-069308 A | 3/2005 |
| JP | 2009-233242 A | 10/2009 |
| KR | 10-1998-0035658 A | 8/1998 |
| KR | 2012-0012177 A | 2/2012 |
| KR | 10-2014-0079056 A | 6/2014 |

*Primary Examiner* — Lori L Lyjak
(74) *Attorney, Agent, or Firm* — Mintz Levin Cohn Ferris Glovsky and Popeo, P.C.; Peter F. Corless

(57) ABSTRACT

An assembly for a vehicle is provided that includes a first member having an attachment surface and a locking bracket made of a composite material. The locking bracket has a shape of a panel having predetermined thickness and area and is connected at a lower surface thereof to the first member by being bonded to the attachment surface of the first member, and is open at an upper surface thereof. Additionally, the locking bracket has a honeycomb structure by using a plurality of intersecting partition walls, with a plurality of upward-open combination spaces being formed in the locking bracket. Further, the assembly includes a locking device disposed on a second member of the vehicle and configured to lock the first member and the second member to each other.

7 Claims, 5 Drawing Sheets

ABSTRACT

ASSEMBLY FOR VEHICLE

CROSS REFERENCE TO RELATED APPLICATION

The present application claims priority to Korean Patent Application No. 10-2015-0176387, filed Dec. 10, 2015, the entire contents of which is incorporated herein for all purposes by this reference.

BACKGROUND

Field of the Invention

The present invention generally relates to an assembly for a vehicle, the assembly being used to connect members of the vehicle using a locking device and a locking bracket made of a composite material.

Description of the Related Art

Generally, when hardware for mounting peripheral devices is added to a lightweight material body made of a composite material, it may be difficult to modify a corresponding mold for a manufacturing process. For example, it may be difficult to add a sliding core to a carbon fiber reinforced plastic (CFRP), and it may be difficult to modify a mold in aluminum die casting. Further, a fracture may occur on a fiber constituting the composite material, and a reduction in rigidity of a member may be caused by addition of through apertures due to a load concentrated on the through apertures.

Meanwhile, when a member made of a fiber reinforced composite material is connected to another member, through apertures are required to be formed for assembly in the members. In the related art, through apertures are typically formed in a member made of a fiber reinforced composite material by milling or water jetting. In particular, however, fractures may occur on the fibers constituting the fiber reinforced composite material of the member, and the fractures may cause cracks around the through apertures, and thus the rigidity of the member is reduced.

The foregoing is intended merely to aid in the understanding of the background of the present invention, and is not intended to mean that the present invention falls within the purview of the related art that is already known to those skilled in the art.

SUMMARY

Accordingly, the present invention provides an assembly for a vehicle, the assembly being used to connect members of the vehicle using a locking device and a locking bracket made of a composite material.

According to one aspect of the present invention, an assembly for a vehicle may include: a first member of the vehicle, the first member having an attachment surface; a locking bracket made of a composite material, wherein the locking bracket has a shape of a panel having predetermined thickness and area, and may be connected at a lower surface thereof to the first member by being bonded to the attachment surface of the first member, and may be open at an upper surface thereof, the locking bracket being configured to have a honeycomb structure using a plurality of intersecting partition walls, with a plurality of upward-open combination spaces being formed in the locking bracket; and a locking device provided on a second member of the vehicle, wherein the locking device protrudes from the second member toward the locking bracket, and a protruding part of the locking device may be inserted into a combination space of the locking bracket and locked thereto, to lock the first member and the second member to each other.

A cross section of the protruding part of the locking device may be configured to correspond to a cross section of the combination space. The cross section of the protruding part of the locking device may be configured to be greater than the cross section of the combination space, and thus the locking device may be inserted into the combination space by a forcible fitting manner. The plurality of combination spaces may be arranged to form rows and columns via the plurality of the intersecting partition walls. The assembly for the vehicle may further include: an insert nut disposed in the combination space, wherein the locking device may include a first bolt inserted into the combination space after passing through the second member, and that may be engaged with the insert nut.

Additionally, the locking device may include a second bolt, of which a head part provided at a first side of the second bolt and functioning as the protruding part of the locking device may be inserted into the combination space and may be locked thereto, and a body part disposed at a second side of the second bolt may pass through the second member; and a locking nut may be engaged with an end part of the second bolt. The assembly of the vehicle may further include: an assembling plate having a locking aperture, the assembling plate being arranged to cover an upper part of the combination space, wherein the locking device may be inserted into the combination space after passing through the locking aperture by a forcible fitting manner.

According to the assembly for the vehicle as mentioned above, it may be possible to solve the problem of a reduction in rigidity of a member caused by fractures that may occur on the member due to through apertures formed in the member. According to the present invention, the locking bracket may more be simply connected to the member using adhesive, tape, snap buttons, or the like. When the locking bracket made of a fiber reinforced composite material is connected to the member of a vehicle, the structure of the member may be reinforced and rigidity of the member may be increased. Accordingly, it may be possible to reduce the thickness of the member of the vehicle due to rigidity reinforced by the locking bracket, and thus it may be possible to reduce the overall weight of the vehicle. Accordingly, improved fuel efficiency may be expected.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
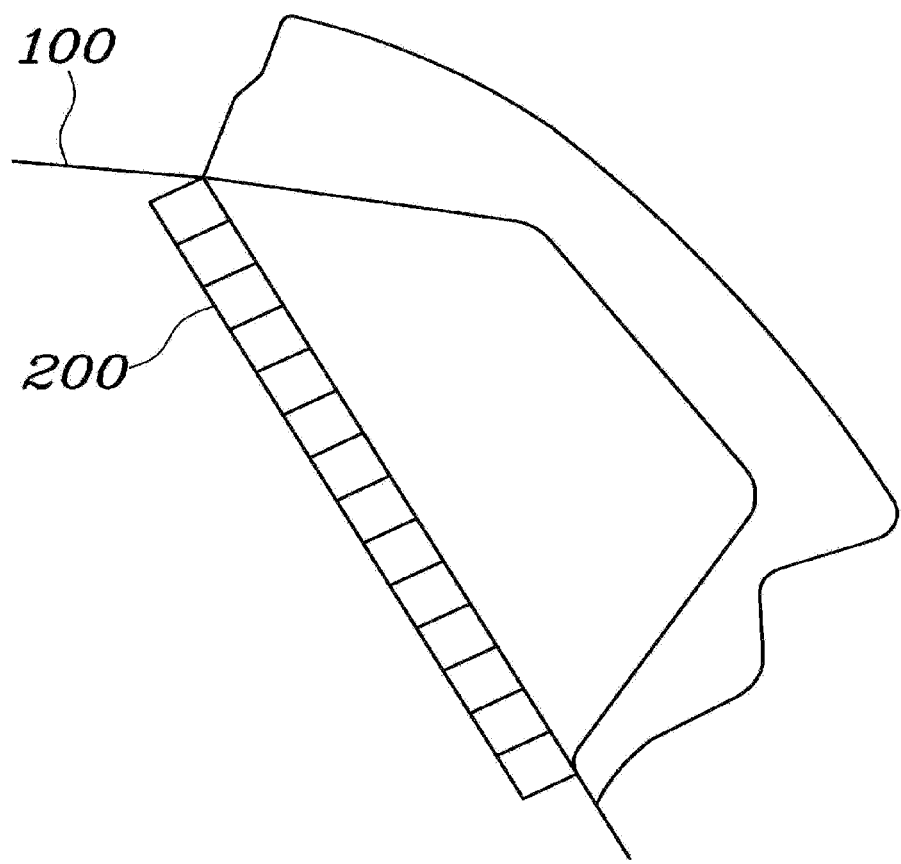
FIG. 1 is a view showing a first member and a locking bracket according to a first exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinbelow, exemplary embodiments of the present invention will be described in detail with reference to the accompanying drawings. Throughout the drawings, the same reference numerals will refer to the same or like parts.

An assembly for a vehicle according to the present invention may include: a first member 100 including an attachment surface; a locking bracket 200 made of a composite material, wherein the locking bracket 200 has a shape of a panel having a predetermined thickness and area, and is connected at a lower surface thereof to the first member 100 by being bonded to the attachment surface of the first member, and is open at an upper surface thereof, the locking bracket 200 having a honeycomb structure by using a plurality of intersecting partition walls, with a plurality of upward-open combination spaces 210 being formed in the locking bracket 200; and a locking device 300 disposed on a second member 400 of the vehicle, wherein the locking device 300 protrudes from the second member 400 toward the locking bracket 200, and a protruding part of the locking device 300 may be inserted into a combination space 210 of the locking bracket 200 and locked thereto to lock the first member 100 and the second member 400 to each other.

When a member made of a fiber reinforced composite material is connected to another member, through apertures are required for assembly in the members. In the related aft, through apertures are typically formed in the member made of the fiber reinforced composite material through milling or water jetting. In particular, however, fractures may occur on the fibers constituting the fiber reinforced composite material of the member, and the fractures may cause cracks around the through apertures, and thus the rigidity of the member may be reduced.

Further, the first member 100 of the vehicle may include the attachment surface and may be made of the fiber reinforced composite material. The lower surface of the locking bracket 200 including the plurality of the combination spaces 210 may be bonded on the attachment surface of the first member 100. The locking bracket 200 may be made of the composite material, and may be connected at the lower surface thereof to the first member 100 by being bonded to the attachment surface, and may be open at the upper surface thereof.

The partition walls may be disposed in the locking bracket 200, and the partition walls may intersect each other, and thus the partition walls divide space in the locking bracket 200. The space divided by the intersecting partition walls may include the plurality of the combination spaces 210. In other words, the locking bracket 200 may be configured to have a honeycomb structure. Particularly, the honeycomb structure indicates that a shape of a cross section of the combination space 210 is not limited to a hexagon, but may have a polygon shape such as a triangle, a rectangle, a square, or a rhombus. In addition, the shape of the cross section of the combination space 210 may also have a shape such as a circle or an oval.

The plurality of the combination spaces 210 having the above-mentioned configuration are substitutes for the through apertures formed on the member of the conventional vehicle. Accordingly, when the locking bracket 200 is connected to the member of the conventional vehicle, it may be possible to solve the problem of a reduction in rigidity of the member of the conventional vehicle caused by fractures that may occur on the member by forming the through apertures on the member of the conventional vehicle.

The locking bracket 200 may be connected to the first member 100 of the vehicle in a simplified manner according to the present invention by using adhesive, tape, or snap buttons including sockets and balls. In response to determining that the above-mentioned method alone cannot ensure that the locking bracket 200 is stably connected to the first member 100, bolts and nuts may be used to connect the first member 100 and the locking bracket 200 more stable. Since a position of the locking bracket 200 may be changed, the locking bracket 200 may be connected to any portion of the vehicle in a simplified manner, and when the number and size of the combination space 210 of the locking bracket 200 are standardized, the locking bracket 200 may be applied to any type of a vehicle.

The locking bracket 200 may include a normal plastic material such as polypropylene (PP) or polyethylene (PE), or may include a lightweight material such as aluminum. When the locking bracket 200 is applied to an area where rigidity is required or a collision is likely to occur, the locking bracket 200 may include a plastic material with a high rigidity, for example, PA (nylon) or PC. The locking bracket 200 may be made of the fiber reinforced composite material such as a carbon fiber or a glass fiber. According to the present invention, when the locking bracket 200 is connected to the member of the vehicle, rigidity of the member of the vehicle may be reinforced. Accordingly, since it may be possible to decrease the thickness of the member of the vehicle due to rigidity reinforced by the locking bracket 200, it may be possible to reduce the weight of the vehicle. Accordingly, improved fuel efficiency may be achieved.

Furthermore, as mentioned above, when the locking bracket 200 may be formed using various types of plastic materials, sockets or balls of snap buttons, bolts, and nuts may be fixed to the locking bracket 200 using a method of insert injection to connect the locking bracket 200 to the first member 100 mentioned above. Of course, sockets or balls of snap buttons, bolts, and nuts may be bonded to the locking bracket 200 using an adhesive.

A predetermined thickness of the locking bracket 200 refers to a thickness that enables the locking bracket 200 to bear a power greater than torque occurring when the locking device 300 is locked to the locking bracket 200. When the locking bracket 200 is applied to the area where rigidity is required or a collision is likely to occur, the thickness of the area where a collision is likely to occur may be formed thicker than a thickness of an area where a collision is not likely to occur. Further, the locking device 300 that will be locked to the locking bracket 200 may be disposed on the second member 400 that will be locked to the first member 100 of the vehicle. The locking device 300 may be locked to the locking bracket 200, and thus the first member 100 and the second member 400 may be locked to each other. Additionally, the locking device 300 may be disposed on the second member 400, and may protrude from the second member 400 toward the first member 100. The protruding part of the locking device 300 may be locked in the combination space 210 by being inserted into the combination space 210 of the locking bracket 200.

A member of a vehicle including a carbon fiber reinforced plastic (CFRP) uses an expensive material such as titanium as a material for the locking device 300 or requires a surface treatment to prevent galvanic corrosion caused by potential difference. However, as for the assembly for the vehicle according to the present invention, since hardware comes into contact only with the locking bracket 200, the hardware does not require surface treatment. The second member 400 mentioned above may include members constituting a vehicle body, and also various options such as a sunroof, an airbag, or an audio system that may be mounted to the first member 100.

Meanwhile, since the plurality of the combination spaces 210 mentioned above may be disposed in the locking bracket 200, when connecting the locking bracket 200 to a moving part such as a hood, a door, or a tailgate, forming the through apertures may be omitted, and thus when only the position of the combination space 210 is adjusted, the locking bracket 200 may be connected to the moving part. Accordingly, the plurality of the combination spaces 210 formed in the locking bracket 200 may be arranged to form rows and columns. Since it may be possible to adjust a whole size of the locking bracket 200 by adjusting the number or size of the combination spaces 210, the assembly for the vehicle according to the present invention may be applied to any type of vehicle.

The plurality of the combination spaces 210 forming the rows and columns provided in the locking bracket 200 enable an immediate response to any kind of a vehicle only by changing the position of the locking bracket 200 without modifying or adding a mold. The locking bracket 200 has a structure that can be applied to outer parts as well as inner panels. When options of the second member 400 are various, varying kinds of wire rings corresponding to the different options are required to be mounted. This means that since a position to which a wire ring is mounted varies according to an option of the second member 400, the position and number of the through apertures change. However, the locking bracket 200 provided with the plurality of the combination spaces 210 forming the rows and columns is only required to be mounted to a location to which the option requires the locking bracket 200 to be mounted. Accordingly, the locking bracket 200 may respond to various options.

As mentioned above, when the locking device 300 is locked in the combination space 210 without being removed from the combination space 210 after the locking device 300 is inserted into the combination space 210, a state in which the first member 100 and the second member 400 of the vehicle are stably locked to each other may be maintained. Accordingly, a cross section of the locking device 300 may be configured to correspond to the cross section of the combination space 210 to provide a tight (e.g., firm, abutting state, etc.) fit of the locking device 300 into the combination space 210. In particular, an area on which the locking device 300 and the combination space 210 come into contact with each other increases, and thus a state in which the locking device 300 is stably locked in the combination space 210 may be maintained.

Furthermore, the cross section of the protruding part of the locking device 300 may be configured to correspond to the cross section of the combination space 210, and the cross section of the protruding part of the locking device 300 may be configured to be greater than the cross section of the combination space 210. Accordingly, when the cross section of the protruding part of the locking device 300 is configured to be greater than the cross section of the combination space 210, the locking device 300 may be inserted into the combination space 210 by a forcible fitting manner. Since the locking device 300 may be inserted into the combination space 210 by a forcible fitting manner, the state in which the locking means 300 is stably locked in the combination space 210 may be maintained.

Figure 2:
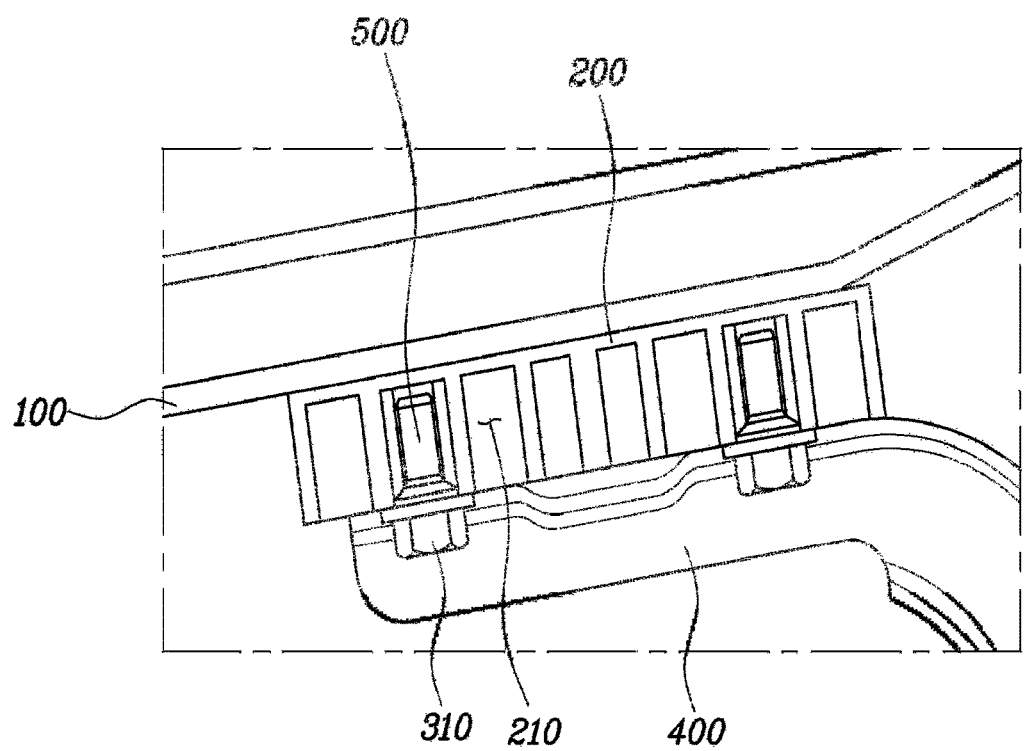
FIG. 2 is a view showing a connected state of the first member and a second member according to the first exemplary embodiment of the present invention.

According to a first exemplary embodiment of the present invention, as shown in FIG. 2, the assembly for the vehicle may further include an insert nut 500 arranged in the combination space, wherein the locking device 300 may include a first bolt 310 inserted into the combination space 210 after passing through the second member 400, and may be engaged with the insert nut 500. The insert nut 500 may be disposed in the combination space 210, and the locking device 300 may be inserted into the combination space 210 by a forcible fitting manner, and thus may not be removed from the combination space 210. Additionally, the locking device 300 may include the first bolt 310, and a body part of the first bolt 310, the body part including threads, configured to pass through the second member 400, and then may be inserted into the combination space 210. The first member 100 and the second member 400 of the vehicle may be locked to each other and thus, the body part of the first bolt 310 inserted into the combination space 210 may be engaged with the insert nut 500 provided in the combination space 210.

Figure 3:
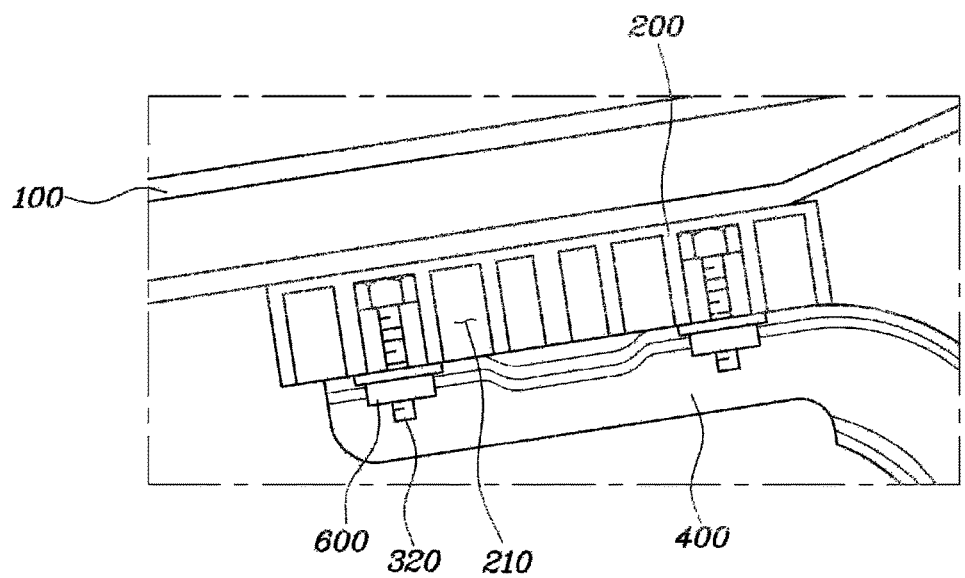
FIG. 3 is a view showing a connected state of a first member and a second member according to a second exemplary embodiment of the present invention.

In addition, according to a second exemplary embodiment of the present invention, as shown in FIG. 3, a locking device 300 of an assembly for a vehicle may include: a second bolt 320, of which a head part disposed at a first side of the second bolt 320 and operating as a protruding part of the locking device 300 may be inserted into a combination space 210 and locked thereto, and a body part disposed at a second side of the second bolt 320 may be configured to pass through a second member 400; and a locking nut 600 may be engaged with an end part of the second bolt 320. The locking device 300 may include the second bolt 320, and the head part of the second bolt 320 may be inserted into the combination space 210 by a forcible fitting manner, and thus may be prevented from being removed from the combination space 210. The body part that protrudes from the head part and having threads may be configured to pass through the second member 400, and the locking nut 600 may be engaged with the end part of the body part by being fastened, thus the first member 100 and the second member 400 of the vehicle may be locked to each other.

Figure 4:
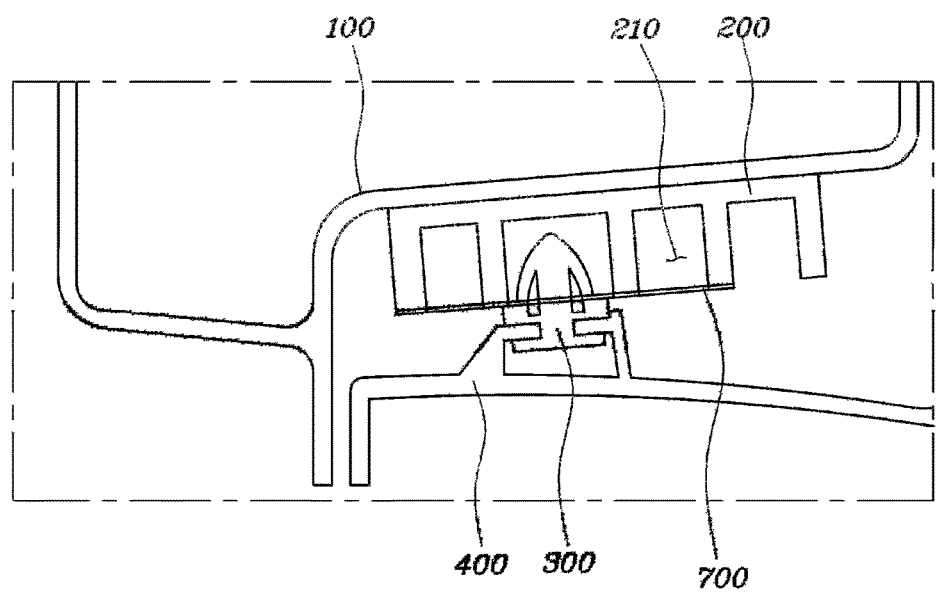
FIG. 4 is a view showing a connected state of a first member and a second member according to a third exemplary embodiment of the present invention.

According to a third exemplary embodiment of the present invention, as shown in FIG. 4, an assembly for a vehicle may further include an assembling plate 700 including a locking aperture, the assembling plate being arranged to cover an upper part of a combination space 210, wherein a locking device 300 may be inserted into the combination space 210 after passing through the locking aperture by a forcible fitting manner. The assembling plate 700 may be plate-shaped, and may be arranged to cover the upper part of a locking bracket 200. The assembling plate 700 and the locking bracket 200 may be connected to each other using adhesive, tape, or rivets.

The assembling plate 700 may include the locking aperture and thus, an upper and a lower surface of the assembling plate 700 may be formed there through, and the locking device 300 may be inserted into the combination space 210 after the locking device 300 passes through the locking aperture by a forcible fitting manner, and thereby the first member 100 and a second member 400 of the vehicle may be locked to each other. In particular, a cross-sectional area of the locking device 300 may be configured to become narrower in a direction toward a front end part of the locking device 300, and thus the locking device 300 may be inserted into the locking aperture by a forcible fitting manner.

Figure 5:
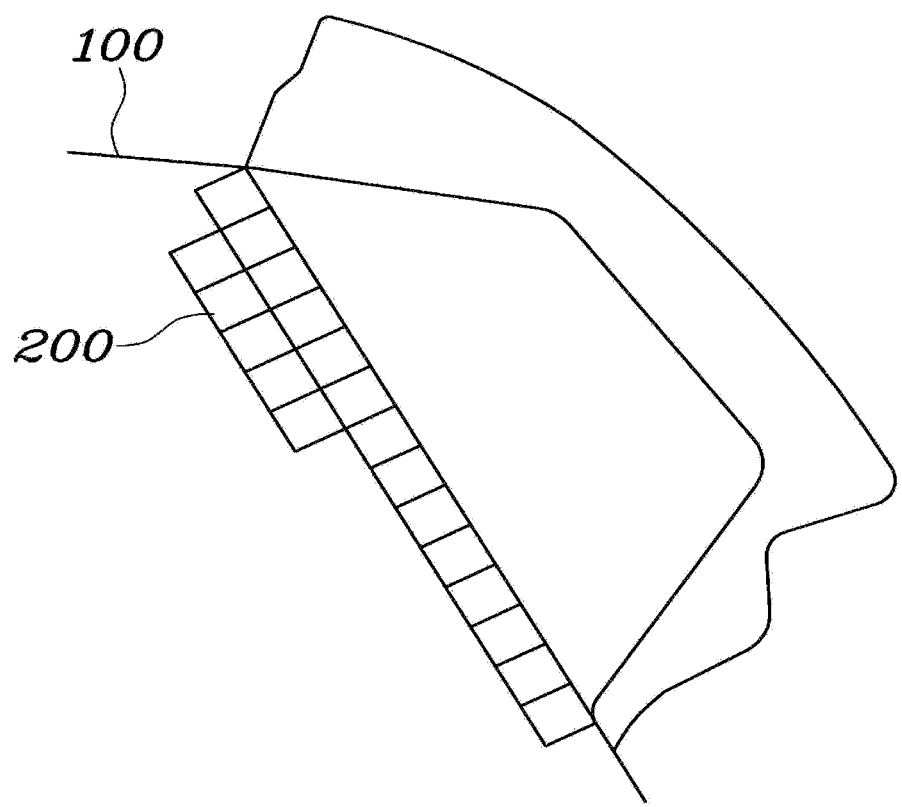
FIG. 5 is a view showing a first member and a locking bracket according to a fourth exemplary embodiment of the present invention.

According to a fourth exemplary embodiment of the present invention, when a second member 400 is unable to be connected to a locking bracket 200 using only a locking device 300 due to the second member 400 to be connected to the locking bracket 200 being spaced apart from the locking bracket 200 at a substantial distance, as shown in FIG. 5, it may be possible to narrow or reduce the distance at which the locking bracket 200 is spaced apart from the second member 400 by forming two layers of the locking bracket 200. When the locking bracket 200 is configured as described above, the locking bracket 200 may function as a bead that reinforces rigidity of a member.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An assembly for a vehicle, comprising:
   a first member of the vehicle including an attachment surface;
   a locking bracket made of a composite material, wherein the locking bracket has a shape of a panel having a predetermined thickness and area, and is connected at a lower surface thereof to the first member by being bonded to the attachment surface of the first member, and is open at an upper surface thereof, the locking bracket having a honeycomb structure using a plurality of intersecting partition walls, with a plurality of upward-open combination spaces being formed in the locking bracket; and
   a locking device disposed on a second member of the vehicle, wherein the locking devices protrudes from the second member toward the locking bracket, and a protruding part of the locking device is inserted into a combination space of the locking bracket and locked thereto to fix the first member and the second member to each other.

2. The assembly of claim 1, wherein a cross section of the protruding part of the locking device corresponds to a cross section of the combination space.

3. The assembly of claim 2, wherein the cross section of the protruding part of the locking device is greater than the cross section of the combination space, and thus the locking device is inserted into the combination space by a forcible fitting manner.

4. The assembly of claim 1, wherein the plurality of the combination spaces are arranged to form rows and columns via the plurality of the intersecting partition walls.

5. The assembly of claim 1, further comprising:
   an insert nut disposed in the combination space,
   wherein the locking device includes a first bolt inserted into the combination space after passing through the second member, and is engaged with the insert nut.

6. The assembly of claim 1, wherein the locking device includes:
   a second bolt, of which a head part disposed at a first side of the second bolt and functioning as the protruding part of the locking device is inserted into the combination space and is locked thereto, and a body part disposed at a second side of the second bolt passes through the second member; and
   a locking nut engaged with an end part of the second bolt.

7. The assembly of claim 1, further comprising:
   an assembling plate including a locking aperture, the assembling plate arranged to cover an upper part of the combination space,
   wherein the locking device is inserted into the combination space after passing through the locking aperture by a forcible fitting manner.

* * * * *